United States Patent Office 3,737,426
Patented June 5, 1973

3,737,426
BIODEGRADEABLE SURFACTANTS FROM
STARCH-DERIVED GLYCOSIDES
Peter E. Throckmorton, Burnsville, and David Aelony,
Minneapolis, Minn., Richard R. Egan, Worthington,
Ohio, and Felix Otey, Peoria, Ill., assignors to the
United States of America as represented by the Secretary of Agriculture
No Drawing. Filed Sept. 25, 1970, Ser. No. 75,742
Int. Cl. C07c 47/18
U.S. Cl. 260—210 R          2 Claims

ABSTRACT OF THE DISCLOSURE

Highly biodegradable surface-active products for cleaning and emulsifying agents and the like are obtained by the chemical reaction of starch-derived ethylene and propylene polyol glycosides such as glycol and glycerol glycosides with ethylene and propylene oxides, long-chain epoxyalkanes, and chlorosulfonic acid.

---

A nonexclusive, irrevocable, royalty-free license in the invention herein described, throughout the world for all purposes of the United States Government, with the power to grant sublicenses for such purposes, is hereby granted to the Government of the United States of America.

BACKGROUND OF THE INVENTION

This invention relates to nonionic surface-active polymeric compounds and their corresponding ionic sulfate derivatives and relates further to ether derivatives of ethoxylated and/or ethoxylated-propoxylated starch-derived glycosides which exhibit exceptional biodegradability, surface-tension lowering, wet-out promotion, and detergency. These products find utility as detergents, surfactants, oil-in-water and water-in-oil emulsifying agents, flotation agents, and wetting agents.

It is an object of this invention to provide a surface-active material with a high degree of biodegradability under a great variety of sewage systems and which would not be predicted from the molecular structure to have intermediate degradation products of high toxicity.

Another object is to provide a surface-active material with highly efficient surface-tension and interfacial-tension lowering, wet-out promotion, and detergency.

The preparation of surface-active agents by reacting various hydroxy compounds with ethylene oxide, propylene oxide, and longer chain epoxides, and combinations of these reactants with various fatty acids is well known in the prior art. For example, U.S. Pat. No. 3,031,510 discloses a surface-active compound produced by reacting trihydroxy mixed poly(oxyethylene-oxy-1,2-propylene) ether of glycerol with a variety of epoxy compounds. Disclosed in U.S. Pat. No. 1,959,930 is a method for preparing surface-active compounds by reacting sorbitol with ethylene or propylene oxide and a fatty acid. Prior inventions differ from this invention in that they either require an undesirable solvent such as dimethyl formamide or dimethyl sulfoxide that is either highly flammable, difficult to remove, or expensive. Or the starting materials are so expensive that the products do not gain industrial acceptance in large-scale detergent applications. Or the products of prior inventions fail to have the combination of intrinsic properties of high biodegradability, outstanding surface-tension and interfacial-tension lowering of water, wet-out promotion, and detergency that are associated with the products of this invention.

In accordance with the objects of this invention, we have discovered that biodegradable surface-active compounds can be made by reacting unmodified starch with ethylene or propylene polyols such as ethylene glycol, propylene glycol, or glycerol in the presence of an acid catalyst such as sulfuric or hydrophosphorous acid. When the polyols are present in the reaction mixture in excess (i.e., more than a 1:1 molar ratio with the starch), a product is formed; that is, after removal of excess polyol, a mixture of glycoside monomers, dimers, and oligosaccharides that contain at least 0.8 mole of reacted polyol per mole of anhydroglucose units (AGU) of starch.

The glycoside mixture is then reacted with 5 to 22 moles but preferably 10 to 2 moles of a short-chain epoxyalkane such as ethylene or propylene oxide, or both, per mole of AGU of the glycoside mixture using a catalyst such as potassium hydroxide, sodium acetate, or sodium acetate in acetic acid to form alkoxylated glycosides. The alkoxylated glycosides are then reacted with from 1 to 4.5 moles but preferably 1 to 3 moles of long-chain epoxyalkanes of the type represented by the general formula:

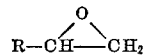

where R is an aliphatic hydrocarbon group having 6 to 18 but preferably 8 to 16 carbon atoms. Lewis acid catalysts such as boron trifluoride complexes or tin tetrachloride are preferred for the long-chain epoxyalkane reaction. These nonionic surfactants are readily converted to ionic surfactants by reacting them with about 1–2 moles sulfating agents such as chlorosulfonic acid per mole of anhydroglucose units.

DETAILED DESCRIPTION OF THE INVENTION

By the process of this invention a very complex mixture of products is obtained. When ethylene glycol is reacted with the starch, 60–80 percent of the product mixture can be represented by the following general formula:

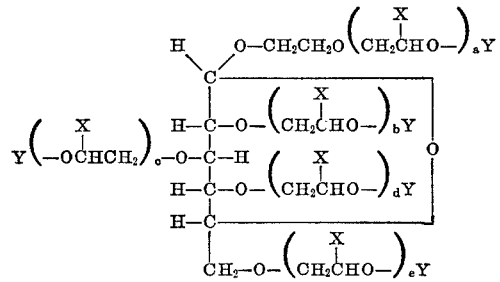

where one to three of the Y's are

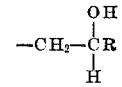

groups formed by the reaction of long-chain epoxyalkanes with one to three of the terminal hydroxyl groups and in which R is an alkyl group having 8 to 16 carbon atoms and in which the remaining Y's are hydrogen; X is either hydrogen or $CH_3$ or in some molecules a combination of the two; and $a$, $b$, $c$, $d$, and $e$ may be any integer such that their combined value is not less than 5 or greater than 22. The remaining 20 to 40 percent of the mixture is more complex. However, by chromatographic analysis of products formed during intermediate stages of the reaction, we have observed fragments of starch molecules containing 2 to perhaps 10 anhydroglucose units that are connected to each other by glycoside or hemiacetal linkages. Each active hydrogen of these oligosaccharides is replaced by the same type groups as shown in the above formula.

A corresponding structure is envisioned when propylene polyols are reacted with starch prior to the epoxide reactions.

When any of the above-described products are reacted with 1 to 2 moles of chlorosulfonic acid per mole of product, from one to two of the —OH groups on the molecule are converted to —OSO$_3$H.

All molecules of this invention have one or more hemiacetal linkages between a hydrophilic-lipophilic chain and the remaining part of the molecule. The hemiacetal or glycoside linkage is readily severed by enzymes of the type that are present in sewage systems.

The reason for the exceptional biodegradability of this product is not fully understood. However, it is believed to be due in part to the highly labile hemiacetal linkage at carbon 1 of each anhydroglucose unit. Once the molecule is severed at this position, the hydrophilic-lipophilic balance of the product is upset to the extent that the product no longer functions as an effective surface-active agent. This linkage is not present in surface-active compounds based on polyols such as glycerol or sorbitol. Furthermore, an examination of the above general formula reveals that at no stage of biodegradation should the product of this invention have highly toxic intermediates.

A number of advantages are obtained in this process. First, the desired surface-active material is obtained in 100 percent yields. Second, no solvent is required at any stage throughout the process; however, solvents may be used if desired. Third, the entire synthesis may be carried out in a conventional reactor. Fourth, the basic polyol, starch, is perhaps the most readily available, low-cost material that is suitable for the synthesis of nonionic surface-active materials.

In order to disclose more clearly the nature of the present invention, specific examples are set forth here below.

Example 1

Step 1: Glycolysis of starch.—Into a reactor was mixed 60.3 kg. (972 moles) of ethylene glycol, 454 g. of concentrated sulfuric acid, and 454 g. of 85 percent hypophosphorous acid. The reactor was sealed, its pressure reduced to 25–30 mm. Hg, and the system heated to 116° C. At this temperature and pressure, 44.5 kg. (242 moles, AGU) of corn starch (containing 12 percent moisture) was added through the bottom of the reactor in 35 minutes. After all of the starch was added, the system was kept at 116°–121° C. for 45 minutes with good stirring and 25–30 mm. Hg pressure. The contents were then cooled to 93° C. and 3.3 kg. of Ba(OH)$_2$·8H$_2$O were added to neutralize the acid catalysts. Excess ethylene glycol was next removed by vacuum distillation at 4–5 mm. Hg pressure as the temperature was slowly increased to 149°–154° C. The vacuum was broken with nitrogen and the product was then cooled, dissolved in 45.4 kg. of water, treated with 2.3 kg. of activated carbon and filtered. Finally, water was removed by vacuum distillation at 38°–49° C. and 5 mm. Hg pressure until the product containing 28.5 percent water.

A dried sample of the above product had a hydroxyl number of 1180, a Gardner color of 1, and was shown by analysis to contain 0.8 mole of reacted glycol per mole of anhydroglucose units. Chromatographic analysis showed the product to be a mixture of about 63 percent glycol glycoside monomers and 37 percent dimer and oligosaccharide.

Step 2: Ethoxylation of starch glycol glycoside product.—Into a reactor was charged 42.1 kg. (30.1 kg.; 142 moles dry basis) of an aqueous solution of glycoside product from Step 1 above. All of the water was removed by vacuum distillation as the temperature was slowly increased to 121° C. and at 29 inches Hg vacuum. Then 60.4 g. of sodium acetate, dissolved in 240 g. warm acetic acid, was introduced while the system was at reduced pressure. The pressure was increased to 5 p.s.i.g. with nitrogen and then to 35 p.s.i.g. with ethylene oxide. Finally, the temperature was increased to 177° C. and held at this temperature until 60.8 kg. (1400 moles) of ethylene oxide had reacted.

The product weighed 91.5 kg. (100 percent of theory), had a hydroxyl number of 375, and contained about 10 moles of reacted ethylene oxide per mole of anhydroglucose units.

Step 3: Long-chain etherification of ethoxylated glycosides.—Into a reactor was charged 45.5 kg. (69 moles) of the ethoxylated glycoside product from Step 2 above. This product was then mixed with 22.7 kg. (123.5 moles) of dodecane-1-oxide and 10.2 kg. of dimethyl ether of ethylene glycol (Monoglyme). To this solution, under continuous stirring and with automatic temperature control set to maintain 91° C., was slowly added at room temperature a separately prepared solution of 680 g. of boron trifluoride (BF$_3$) and 3.4 kg. of Monoglyme. The reaction was exothermic and the rate of BF$_3$-solution addition was slow enough to prevent over-riding the cooling capacity of the vessel. The addition required about 30 minutes. After the BF$_3$ was all added, stirring was continued for 3.5 hours at 88° C. to assure complete reaction of the dodecane-1-oxide. The Monoglyme was then recovered by vacuum distillation at 20–40 mm. Hg pressure as the temperature was increased to 104° C. Then the liquid product was bleached to Gardner color 6 by adding 680 g. of 70 percent hydrogen peroxide and heating for 2 hours at 106° C.

The final product weighed the theoretical 68.0 kg., had a specific gravity of 1.08, a hydroxyl number of 228, was free of unreacted oxirane, and contained 10 moles of reacted ethylene oxide and 1.8 moles of reacted dodecane-1-oxide per mole of anhydroglucose units. The product had excellent surface-tension and detergency properties and was highly biodegradable.

At a 1 percent concentration in water the product had an interfacial surface-tension of 5.4 dynes/cm., a Canvas Disc wet-out time of 14.3 seconds, and in a standard detergent formulation it demonstrated an excellent 30 percent soil removal (Soil removal test: Hunter reflectometer measurements and procedures from J. C. Harris, "Detergency Evaluation and Testing," Interscience Publishers, Inc., New York, 1954). In standard tests for acute oral toxicity on adult albino male rats, the product had an estimated oral LD 50 in excess of 10 g. per kilogram of body weight. Within the meaning of the Federal Hazardous Substances Labeling Act, the product is not toxic orally.

Example 2

Into a reaction flask was weighed 60.7 g. of dry etherified glycoside which was made by reacting 1 mole of glycol glycosides with a mixture containing 8 moles of ethylene oxide and 4 moles of propylene oxide. One gram of the final surfactant, prepared in Example 1, Step 3, and 22.4 g. (0.122 mole) of dodecane-1-oxide were then added to form a homogenous mixture. One gram of boron trifluoride etherate was then added which caused the temperature to rapidly rise from 33° to 70° C. The reaction was considered complete at this time but the solution was stirred at 90° C. for an additional hour to assure complete reaction. The product was a clear liquid that contained 8 moles of reacted ethylene oxide, 4 moles of reacted propylene oxide, and 1.3 moles of reacted dodecane-1-oxide per mole of anhydroglucose units. Yield of the product was theoretical. It had outstanding surface-active and detergency properties and was highly biodegradable. At a 1 percent concentration in water, the product had an interfacial surface-tension of 1.6 dynes/cm., a Canvas Disc wet-out time of 4.4 seconds, and in a standard detergent formulation it produced 34 percent soil removal.

Example 3

To 255 ml. of tetrahydrofuran in a round-bottom flask was added 64.8 g. (0.10 mole) of polyethoxylated glycol glycoside (prepared as described in Example 1, Step 2). When dissolution was complete, 1.0 g. boron trifluoride etherate and 38.5 g. (0.20 mole) dodecane-1-oxide were added. In 30 minutes the contents of the flask exothermed from 25° to 33° C. To assure a complete reaction the material was stirred 63 hours at room conditions, filtered, and finally concentrated in vacuum to yield 105.8 g. (theory 104.3 g.) of surfactant. The product was a light tan, clear liquid with excellent surfactant and cleaning properties and decomposed in an activated sewage culture. At 1 percent concentration in water the product imparted an interfacial tension of 8.4 dynes/cm. and a Canvas Disc wet-out time of 13 seconds.

Example 4

The procedure and product of this example differ from that of Example 1 above, only in that each mole of glycol glycoside was reacted with 15 moles of ethylene oxide, 7.5 moles of propylene oxide, and 2 moles of mixed long-chain epoxyalkane containing 80 percent of a $C_{14}$ and 20 percent of a $C_{16}$ carbon chain. The clear liquid product demonstrated excellent surface-tension lowering, Canvas Disc wet-out, and cleaning properties.

Example 5

A mixtures of glycerol glycosides was prepared as described in Example 1, Step 1 above, except glycerol was used instead of glycol, and the reaction temperature was increased to about 140° C. The glycerol glycoside product was then reacted with a mixture containing 8 moles of ehtylene oxide and 4 moles of propylene oxide per mole of anhydroglucose units by the procedure described in Example 1, Step 2 above. This oxylated product was then reacted with 1 mole of dodecane-1-oxide per mole of anhydroglucose units by the procedure described in Example 1, Step 3 above. This final product was a clear liquid that demonstrated excellent surface-tension lowering, Canvas Disc wet-out, and biodegradable properties. It had an LD 50 in excess of 10 g. per kilogram of body weight which within the meaning of the Federal Hazardous Substances Labeling Act, the product is not toxic orally.

Example 6

The procedure and product of this example differ from that of Example 5 above in that each mole of glycerol glycoside was reacted with 17.3 moles of ethylene oxide and 2.6 moles of dodecane-1-oxide. Also, 1 g. of the surfactant product of Example 5 was added in place of a solvent for the fatty epoxide reaction. The clear liquid product demonstrated excellent surface-tension lowering, Canvas Disc wet-out, and cleaning properties.

Example 7

The product of this example differs from that of the solvent-free process in Example 2 above, only in that each mole of glycol glycoside was reacted with 10 moles of ethylene oxide and 2 moles of dodecane-1-oxide. The product demonstrated excellent surfactant properties.

Example 8

To a solution containing 73 g. (0.049 mole) of the surfactant product from Example 6 above and 35 g. of chloroform was added dropwise, during 10 minutes, a solution containing 5.7 g. (0.049 mole) of chlorosulfonic acid and 12 g. of diethyl ether. An ice bath was used to maintain a reaction temperature of 20°-23° C. The resulting solution was then neutralized with an aqueous solution containing about 0.1 mole of sodium hydroxide.

The sulfated product was isolated in quantitative yield by removing the water, ether, and chloroform with a rotary vacuum evaporator. The viscous liquid product contained about 2.6 moles of reacted dodecane-1-oxide, 17.3 moles of reacted ethylene oxide, 1 mole of reacted glycerol, and 0.7 mole of sulfate per mole of anhydroglucose units. It readily formed a clear solution with water that was foamy and that could be used for laundry purposes.

Example 9

The product and procedure of this example differ from that of Example 8 above, only in that 2 moles of chlorosulfonic acid were reacted with 1 mole of surfactant prepared by reacting 2 moles of a $C_{18}$ epoxyalkane and 10 moles of ethylene oxide with 1 mole of glycol glycoside. The product was soluble in water, and at a 1 percent concentration it lowered the interfacial surface-tension of water to 14.7 dynes/cm.

We claim:

1. A composition comprising from 60 to 80 percent by weight of a monosaccharide having the following general formula:

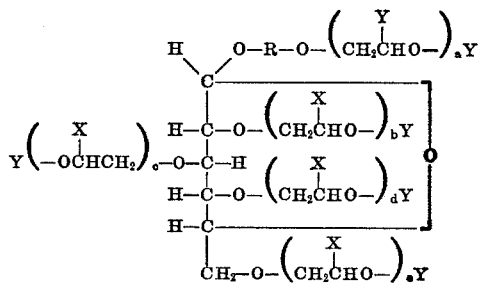

where R is

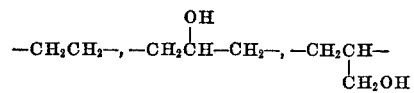

or

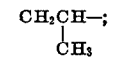

X is $—CH_3$ or $—H$; one to three of the Y's are

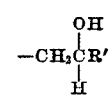

the remaining Y's being $—H$; R' is a long-chain alkyl group having 8 to 16 carbon atoms; and $a$, $b$, $c$, $d$, and $e$ are integers such that $a+b+c+d+e=$ from 5 to 22; and the remaining 20 to 40 percent of said composition being di- and oligosaccharides having from 2 to 10 anhydroglucose units, each having the same general formula as said monosaccharides.

2. A composition comprising from 60 to 80 percent by weight of a monosaccharide sulfate having the following general formula:

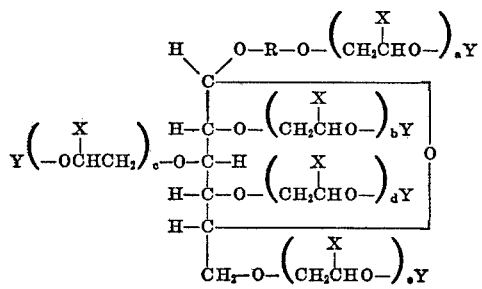

where R is

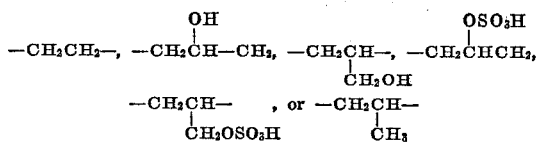

X is —$CH_3$ or —H; one to two of the Y's are

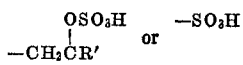

zero to three of the Y's are

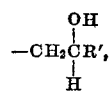

the remaining Y's being —H; R' is a long-chain alkyl group having 8 to 16 carbon atoms; and $a$, $b$, $c$, $d$, and $e$ are integers such that $a+b+c+d+e=$ from 5 to 22; and the remaining 20 to 40 percent of said composition being di- and aligosaccharide sulfates having from 2 to 10 anhydroglucose units, each having the same general formula as said monosaccharide sulfates.

References Cited
UNITED STATES PATENTS

| | | | |
|---|---|---|---|
| 3,057,855 | 10/1962 | Smith et al. | 260—234 R |
| 3,075,965 | 1/1963 | Touey et al. | 260—234 R |
| 3,165,508 | 1/1965 | Otey et al. | 260—209 R |
| 3,275,576 | 9/1966 | Flodin et al. | 260—209 R |
| 3,370,056 | 2/1968 | Yotsuzuka et al. | 260—209 R |
| 3,640,998 | 2/1972 | Mansfield et al. | 260—210 R |

LEWIS GOTTS, Primary Examiner

J. R. BROWN, Assistant Examiner

U.S. Cl. X.R.

252—89, 352, 353; 260—234 R, 209 R, 233.3 R